(12) United States Patent
Yokoi

(10) Patent No.: US 8,482,624 B2
(45) Date of Patent: Jul. 9, 2013

(54) IMAGE PICKUP DEVICE WITH STILL PICTURE PICKUP FUNCTION DURING MOVING PICTURE PICKUP OPERATION

(75) Inventor: Makoto Yokoi, Musashino (JP)

(73) Assignee: Casio Computer Co., Ltd., Tokyo (JP)

( * ) Notice: Subject to any disclaimer, the term of this patent is extended or adjusted under 35 U.S.C. 154(b) by 1592 days.

(21) Appl. No.: 11/964,573

(22) Filed: Dec. 26, 2007

(65) Prior Publication Data

US 2008/0112689 A1 May 15, 2008

Related U.S. Application Data

(62) Division of application No. 10/722,734, filed on Nov. 25, 2003, now Pat. No. 7,432,957.

(30) Foreign Application Priority Data

Dec. 6, 2002 (JP) .................................. 2002-354571
Oct. 17, 2003 (JP) .................................. 2003-357132

(51) Int. Cl.
*H04N 5/225* (2006.01)
*H04N 5/222* (2006.01)
*H04N 5/232* (2006.01)
*H04N 5/235* (2006.01)
*G03B 13/00* (2006.01)
*G03B 7/00* (2006.01)

(52) U.S. Cl.
USPC .................... 348/220.1; 348/333.04; 348/345; 348/362

(58) Field of Classification Search
USPC .................. 348/220.1, 333.04, 373–376, 345, 348/362
See application file for complete search history.

(56) References Cited

U.S. PATENT DOCUMENTS

| 4,714,963 A | 12/1987 | Vogel ........................... 348/220.1 |
| 4,837,628 A | 6/1989 | Sasaki |

(Continued)

FOREIGN PATENT DOCUMENTS

JP   05-191699   7/1993

(Continued)

OTHER PUBLICATIONS

Japanese language office action and its English language translation for corresponding Japanese application 2008119718, Dated Dec. 2, 2008.

*Primary Examiner* — Roberto Velez
*Assistant Examiner* — Tuan Le
(74) *Attorney, Agent, or Firm* — Hogan Lovells US LLP

(57) ABSTRACT

An image pickup device is equipped with a function to a pickup still picture during a moving picture pickup operation with voices. After a moving picture pickup processing with voices is started (YES in S2), a moving picture recording processing and a voice recording processing are started (S14). Subsequently, when a shutter button is depressed halfway (YES in S16), the moving picture recording processing is switched to a processing to store substitute frames, which are a copy of frame data immediately preceding the half depression operation of the shutter button, instead of moving picture frames imaged in moving picture frame cycles (step S20), and a still picture pickup processing is performed. After the still picture pickup processing ends, the normal moving picture recording processing is resumed. When a picture recording end button is operated (YES in S17), a moving picture file with voices is created from frame data, which includes substitute frames, and voice data, both of which are accumulated and stored in a buffer memory (S18). As a result, even thought the moving picture pickup operation is interrupted, moving pictures can be recorded as a single moving picture file.

8 Claims, 11 Drawing Sheets

U.S. PATENT DOCUMENTS

| | | | |
|---|---|---|---|
| 5,335,042 A | 8/1994 | Imafuji et al. | |
| 5,703,638 A * | 12/1997 | Ohta et al. | 348/220.1 |
| 6,009,279 A * | 12/1999 | Kai et al. | 396/55 |
| 6,359,649 B1* | 3/2002 | Suzuki | 348/220.1 |
| 6,424,795 B1 | 7/2002 | Takahashi et al. | 386/120 |
| 6,680,748 B1* | 1/2004 | Monti | 348/220.1 |
| 6,937,273 B1* | 8/2005 | Loui | 348/220.1 |
| 6,961,083 B2 | 11/2005 | Obrador | 348/220.1 |
| 7,787,027 B2* | 8/2010 | Suzuki et al. | 348/231.99 |
| 2001/0040626 A1 | 11/2001 | Ohta et al. | |
| 2002/0021361 A1 | 2/2002 | Kitajima et al. | |
| 2002/0021903 A1* | 2/2002 | Ito et al. | 396/429 |
| 2002/0057351 A1 | 5/2002 | Suzuki et al. | |
| 2002/0140826 A1 | 10/2002 | Sato et al. | |
| 2002/0196348 A1* | 12/2002 | Kubo | 348/220.1 |
| 2003/0030732 A1* | 2/2003 | Asada | 348/231.4 |
| 2003/0048365 A1* | 3/2003 | Saito et al. | 348/231.7 |
| 2003/0095191 A1* | 5/2003 | Saito | 348/220.1 |

FOREIGN PATENT DOCUMENTS

| | | |
|---|---|---|
| JP | 09-200588 | 7/1997 |
| JP | 09-233410 | 9/1997 |
| JP | 10-200859 | 7/1998 |
| JP | 11-055617 | 2/1999 |
| JP | 11-164236 | 6/1999 |
| JP | 11-196300 | 9/1999 |
| JP | 2000-023087 | 1/2000 |
| JP | 2000-175098 | 6/2000 |
| JP | 2000-295568 | 10/2000 |
| JP | 2000-324434 | 11/2000 |
| JP | 2000-352759 | 12/2000 |
| JP | 2001-103361 | 4/2001 |
| JP | 2001-111934 | 4/2001 |
| JP | 2002-041343 | 2/2002 |
| JP | 2002-142179 | 5/2002 |
| JP | 2002-183099 | 6/2002 |
| JP | 2002-290908 | 10/2002 |
| JP | 2003-092724 | 3/2003 |
| JP | 2003-158653 | 5/2003 |
| WO | 99/40723 | 8/1999 |

* cited by examiner

IMAGE PICKUP DEVICE WITH STILL PICTURE PICKUP FUNCTION DURING MOVING PICTURE PICKUP OPERATION

CROSS-REFERENCE TO RELATED APPLICATIONS

This application is a divisional of application Ser. No. 10/722,734, filed on Nov. 25, 2003, which claims priority under 35 USC 119 in Japanese patent application no. 2002-354571, filed on Dec. 6, 2002 and Japanese patent application no. 2003-357132, filed on Oct. 17, 2003, the entire contents of which applications are hereby incorporated by reference in their entireties.

BACKGROUND OF THE INVENTION

1. Field of the Invention

The present invention relates to an image pickup device with a function to pickup still pictures while imaging a moving picture, as well as its image pickup method.

2. Related Art

Among digital cameras in which picture signals of a subject picked up by a solid-state image pickup element such as a CCD are converted into digital signals and the resulting picture data are recorded on recording media, some have a moving picture pickup function in addition to the normal still picture pickup function, while some have a function to pickup pictures with voices that simultaneously records voices and still pictures or moving pictures.

In such digital cameras, a still picture pickup mode, in which still pictures are picked up, and a moving picture pickup mode, in which moving pictures are picked up, are independently provided as image pickup modes and the modes are switched one from the other through user operation such as a key operation.

Several methods have been proposed for picking up a still picture during picking up a moving picture using a digital camera. In one of such methods, when there is a user operation to pickup a still picture during a moving picture pickup operation, while moving picture frames are picked up at moving picture frame cycles in the moving picture pickup operation and stored in a buffer memory, a still picture is picked up and recorded while the next moving picture frame is recorded. In effect, in this method, the moving picture pickup processing and the still picture pickup processing take place in parallel.

In another method, when there is a user operation to pickup a still picture while picking up a moving picture, the operation to image and store moving picture frames is interrupted temporarily, a still picture is picked up and recorded during the interruption, and imaging and storing of moving picture frames are subsequently resumed. In other words, a still picture pickup operation is conducted through an interrupt processing. When the moving picture pickup operation is finished, frames for interpolation purposes that correspond to moving picture frames during the interrupted period, which is a period during which moving picture frames could not be picked up due to the still picture pickup processing, are separately created and stored; and when the moving picture is reproduced, interpolation frames are displayed in the interrupted period. In this way, a still picture pickup operation during a moving picture pickup operation is made possible.

SUMMARY OF THE INVENTION

In accordance with an embodiment of the present invention, an image pickup device comprises: an imaging section that executes a moving picture pickup processing and a still picture pickup processing; a voice recording section that executes a voice recording processing in parallel with the moving picture pickup processing; and an interrupt processing section that sequentially executes, during the moving picture pickup processing by the imaging section, a processing to suspend the moving picture pickup processing by the imaging section, a processing to pickup a still picture by the imaging section, and a processing to resume the moving picture pickup processing by the imaging section, wherein the interrupt processing section causes the voice recording processing to be continually executed by the voice recording section in parallel with the moving picture pickup processing before the moving picture pickup processing is suspended, until the moving picture pickup processing is resumed.

In accordance with another embodiment of the present invention, an image pickup device comprises: an imaging section for executing a moving picture pickup processing and a still picture pickup processing; an interrupt processing section that sequentially executes, during the moving picture pickup processing by the imaging section, a processing to suspend the moving picture pickup processing by the imaging section, a processing to pickup a still picture by the imaging section, and a processing to resume the moving picture pickup processing by the imaging section; and a synchronization control section that synchronizes a start timing for resuming the moving picture pickup processing by the imaging section with a moving picture frame pickup cycle of the moving picture pickup processing taking place before the moving picture pickup processing is suspended.

In accordance with another embodiment of the present invention, an image pickup device comprises: an imaging section that executes a moving picture pickup processing and a still picture pickup processing; an interrupt processing section that sequentially executes, during the moving picture pickup processing by the imaging section, a processing to suspend the moving picture pickup processing by the imaging section, a processing to pickup a still picture by the imaging section, and a processing to resume the moving picture pickup processing by the imaging section; a timer section that measures a time elapsed since the execution of the processing to suspend the moving picture pickup processing by the interrupt processing section; a determination section that determines whether the elapsed time measured by the timer section has reached a predetermined length of time before the processing to resume the moving picture pickup processing is executed by the interrupt processing section; and a predetermined processing execution section that executes a predetermined processing if the determination section determines that the predetermined length of time has been reached.

In accordance with another embodiment of the present invention, an imaging device comprises: an imaging section that executes a moving picture pickup processing and a still picture pickup processing; and an interrupt processing section that sequentially executes, during the moving picture pickup processing by the imaging section, a processing to suspend the moving picture pickup processing by the imaging section, a processing to pickup a still picture by the imaging section, and a processing to resume the moving picture pickup processing by the imaging section, wherein the interrupt processing section is configured to execute the still picture pickup processing a plurality of times between the time the processing to suspend the moving picture pickup processing is executed and the time the processing to resume the moving picture pickup processing is executed.

In accordance with another embodiment of the present invention, an imaging method for an image pickup device with a function to pickup still pictures during a moving picture pickup operation, comprises: a step for executing a moving picture pickup processing; a step for executing a voice recording processing in parallel with the moving picture pickup processing; a step for sequentially executing, during the moving picture pickup processing, a processing to suspend the moving picture pickup processing, a processing to pickup a still picture, and a processing to resume the moving picture pickup processing; and a step for continuing the execution of the voice recording processing, which is executed in parallel with the moving picture pickup processing before the moving picture pickup processing is suspended, until the moving picture pickup processing is resumed.

In accordance with another embodiment of the present invention, an imaging method for an image pickup device with a function to pickup still pictures during a moving picture pickup operation, comprises: a step for executing the moving picture pickup processing; a step for sequentially executing, during the moving picture pickup processing, a processing to suspend the moving picture pickup processing, a processing to pickup a still picture, and a processing to resume the moving picture pickup processing; and a step for synchronizing a start timing to resume the moving picture pickup processing with a moving picture frame pickup cycle of the moving picture pickup processing executed before the moving picture pickup processing is suspended.

In accordance with another embodiment of the present invention, an imaging method for an image pickup device with a function to pickup still pictures during a moving picture pickup operation, comprises: a step for executing a moving picture pickup processing; a step for sequentially executing, during the moving picture pickup processing, a processing to suspend the moving picture pickup processing, a processing to pickup a still picture, and a processing to resume the moving picture pickup processing; a step for measuring a time elapsed since the execution of the processing to suspend the moving picture pickup processing; a step for determining whether the elapsed time measured has reached a predetermined length of time before the processing to resume the moving picture pickup processing is executed; and a step for executing a predetermined processing if it is determined that the predetermined length of time has been reached.

In accordance with another embodiment of the present invention, an imaging method for an image pickup device with a function to pickup still pictures during a moving picture pickup operation, comprises: a step for executing a moving picture pickup processing; a step for sequentially executing, during the moving picture pickup processing, a processing to suspend the moving picture pickup processing, a processing to pickup a still picture, and a processing to resume the moving picture pickup processing; and a step for executing the still picture pickup processing a plurality of times between the time the processing to suspend the moving picture pickup processing is executed and the time the processing to resume the moving picture pickup processing is executed.

In accordance with another embodiment of the present invention, a program renders a computer of an image pickup device with a function to pickup still pictures during a moving picture pickup operation to execute: a processing for executing a moving picture pickup processing; a processing for executing a voice recording processing in parallel with the moving picture pickup processing; a processing for sequentially executing, during the moving picture pickup processing, a processing to suspend the moving picture pickup processing, a processing to pickup a still picture, and a processing to resume the moving picture pickup processing; and a processing for continuing the execution of the voice recording processing, which is executed in parallel with the moving picture pickup processing before the moving picture pickup processing is suspended, until the moving picture pickup processing is resumed.

In accordance with another embodiment of the present invention, a program renders a computer of an image pickup device with a function to pickup still pictures during a moving picture pickup operation to execute a processing for executing a moving picture pickup processing; a processing for sequentially executing, during the moving picture pickup processing, a processing to suspend the moving picture pickup processing, a processing to pickup a still picture, and a processing to resume the moving picture pickup processing; and a processing for synchronizing a start timing to resume the moving picture pickup processing with a moving picture frame pickup cycle of the moving picture pickup processing conducted before the moving picture pickup processing is suspended.

In accordance with another embodiment of the present invention, a program renders a computer of an image pickup device with a function to pickup still pictures during a moving picture pickup operation to execute: a processing for executing a moving picture pickup processing; a processing for sequentially executing, during the moving picture pickup processing, a processing to suspend the moving picture pickup processing, a processing to pickup a still picture, and a processing to resume the moving picture pickup processing; a processing for measuring a time elapsed since the execution of the processing to suspend the moving picture pickup processing; a processing for determining whether the elapsed time measured has reached a predetermined length of time before the processing to resume the moving picture pickup processing is executed; and a processing for executing a predetermined processing if a determination is made that the predetermined length of time has been reached.

In accordance with another embodiment of the present invention, a program renders a computer of an image pickup device with a function to pickup still pictures during a moving picture pickup operation to execute: a processing for executing a moving picture pickup processing; a processing for sequentially executing, during the moving picture pickup processing, a processing to suspend the moving picture pickup processing, a processing to pickup a still picture, and a processing to resume the moving picture pickup processing; and a processing for executing the still picture pickup processing a plurality of times between the time the processing to suspend the moving picture pickup processing is executed and the time the processing to resume the moving picture pickup processing is executed.

Other features and advantages of the invention will be apparent from the following detailed description, taken in conjunction with the accompanying drawings that illustrate, by way of example, various features of embodiments of the invention.

DESCRIPTION OF PREFERRED EMBODIMENTS

Embodiments of the present invention will be described with reference to the accompanying drawings.

First Embodiment

Figure 1:
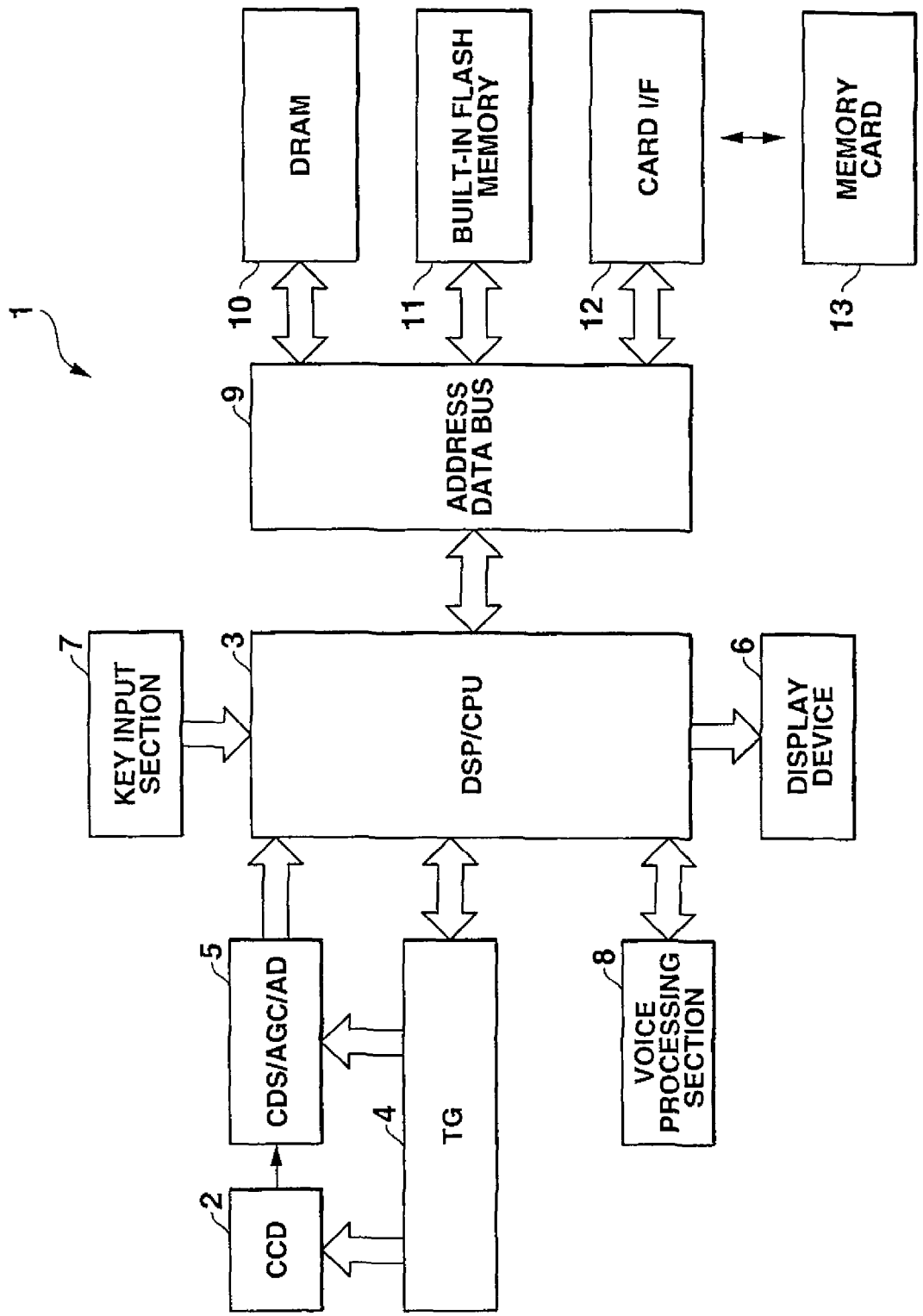
FIG. 1 is a block diagram of a digital camera in accordance with a first embodiment of the present invention.

FIG. 1 is a block diagram of an overall configuration of a digital camera 1, which has a moving picture pickup function and a moving picture pickup function with voices, in addition to a normal still picture pickup function. The digital camera 1 includes a CCD 2 and a DSP/CPU 3. The DSP/CPU 3 is a single-chip microcomputer that has various digital signal processing functions, including compression/decompression of picture data and processing of voice data, and that controls various sections of the digital camera 1.

To the DSP/CPU 3 is connected a TG (time generator) 4 that drives the CCD 2; and to the TG 4 is connected a unit circuit 5. Analog imaging signals that are outputted from the CCD 2 and that correspond to optical pictures of subjects are inputted in the unit circuit 5. The unit circuit 5 includes a CDS (Correlated Double Sampling) circuit that performs correlated double sampling on imaging signals outputted from the CCD 2 and retains the sampled imaging signals, a gain adjustment amplifier (AGC) that amplifies the imaging signals, and an A/D converter CAD) that converts the imaging signals that have been amplified into digital signals. Signals outputted from the CCD 2 are sent as digital signals to the DSP/CPU 3 via the unit circuit 5.

The DSP/CPU 3 connects to a display device 6, a key input section 7 and a voice processing section 8, as well as a DRAM 10, a built-in flash memory 11 and a card interface 12 via an address data bus 9; to the card interface 12 is connected a memory card 13, which is mounted in a freely detachable manner on a card insertion slot, not shown, of the main body of the digital camera 1.

The display device 6 includes a color LCD and its drive circuit; the display device 6 displays a subject picture imaged with the CCD 2 as a through-picture in an image pickup standby state, while displaying recorded pictures (still pictures or moving pictures) that have been read from the memory card 13, which is a storage memory, and decompressed when reproducing recorded pictures. The key input section 7 includes a plurality of user operation keys such as a shutter button, picture recording start/end buttons used in picking up moving pictures, a power on/off key and a menu key; the key input section 7 outputs to the DSP/CPU 3 key input signals corresponding to key operations by the user. It is noted that the shutter button is a two-stage switch that outputs different output signals in a half-depressed state and a fully depressed state.

The voice processing section 8 includes a built-in microphone, an amplifier, an A/D converter, a built-in speaker, and a D/A converter; when picking up still pictures or moving pictures with voices, the voice processing section 8 converts voices inputted into the built-in microphone into digital signals and sends them to the DSP/CPU 3. The voice data sent to the DSP/CPU 3 are sequentially accumulated and ultimately recorded in the memory card 13 along with picture data created by the DSP/CPU 3. Furthermore, when still pictures or moving pictures with voices are reproduced, the voice processing section 8 reproduces voices based on voice data appended to each picture and outputs the voices through the built-in speaker. In addition, the voice processing section 8 outputs various notice tones through the built-in speaker as necessary.

The DRAM 10 is a buffer memory that temporarily stores picture data of subjects that have been digitalized after being imaged with the CCD 2, but also functions as a working memory for the DSP/CPU 3. The built-in flash memory 11 stores programs required for various controls, including control programs required for the control of various sections by the DSP/CPU 3, i.e., AF (auto focus control) and AE (auto exposure control), as well as data required for various controls; by operating according to such programs, the DSP/CPU 3 functions as a control unit, a moving picture file creation unit, a timer unit, an informing sound control unit, and a predetermined operation control unit.

Figure 2:
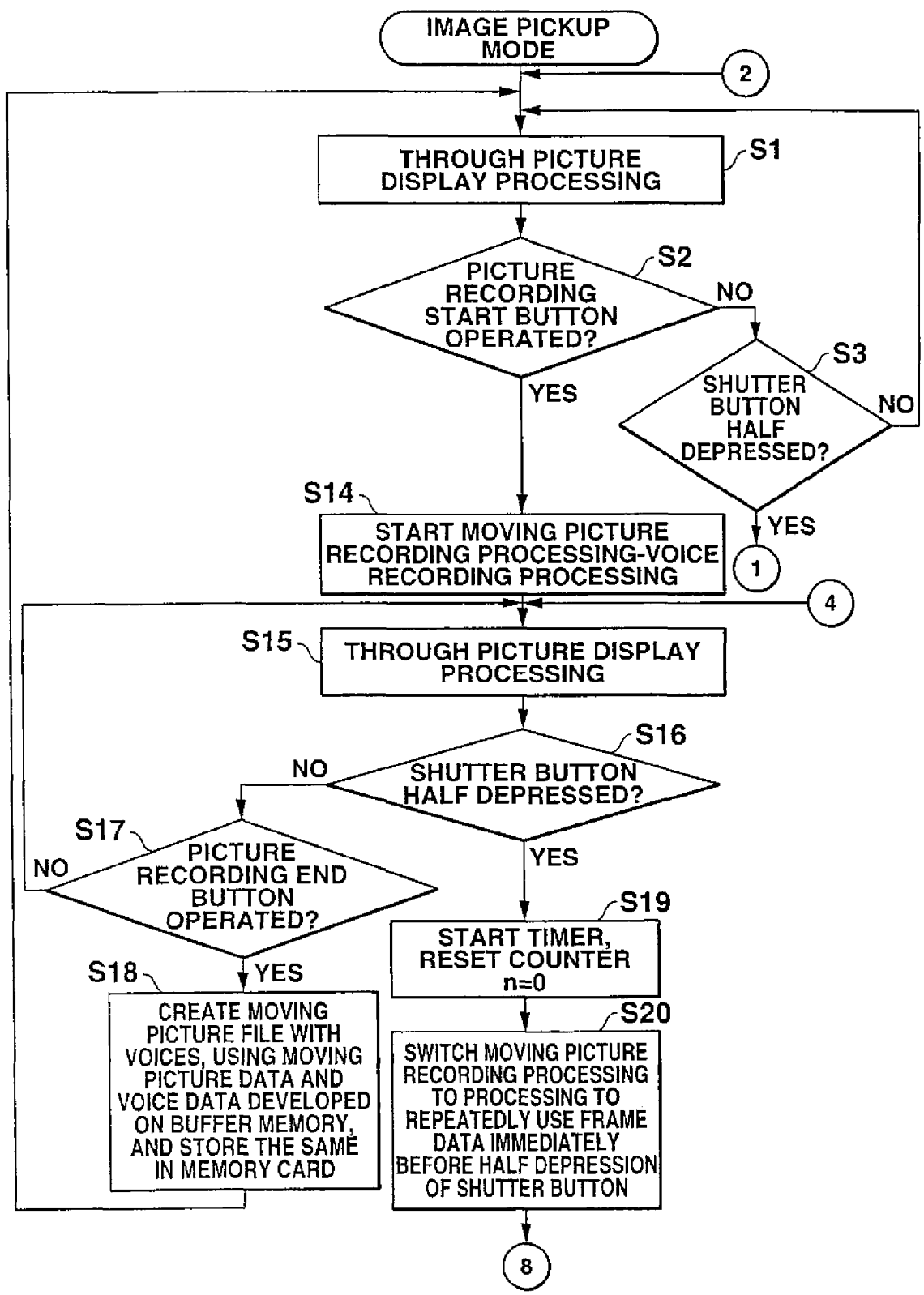
FIG. 2 is a flowchart of an operation in an image pickup mode of the digital camera.
Figure 3:
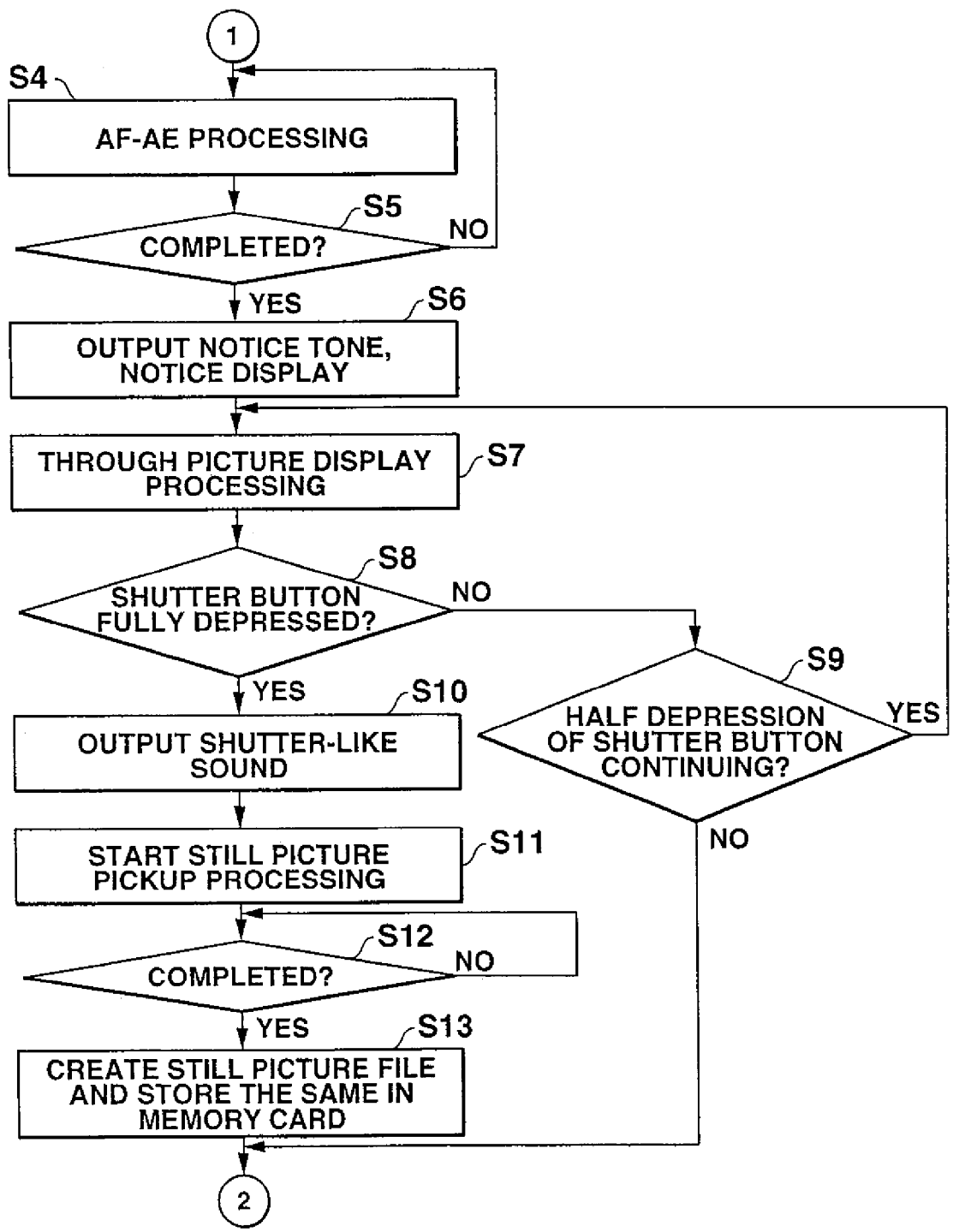
FIG. 3 is a flowchart continuing from the flowchart in FIG. 2.
Figure 4:
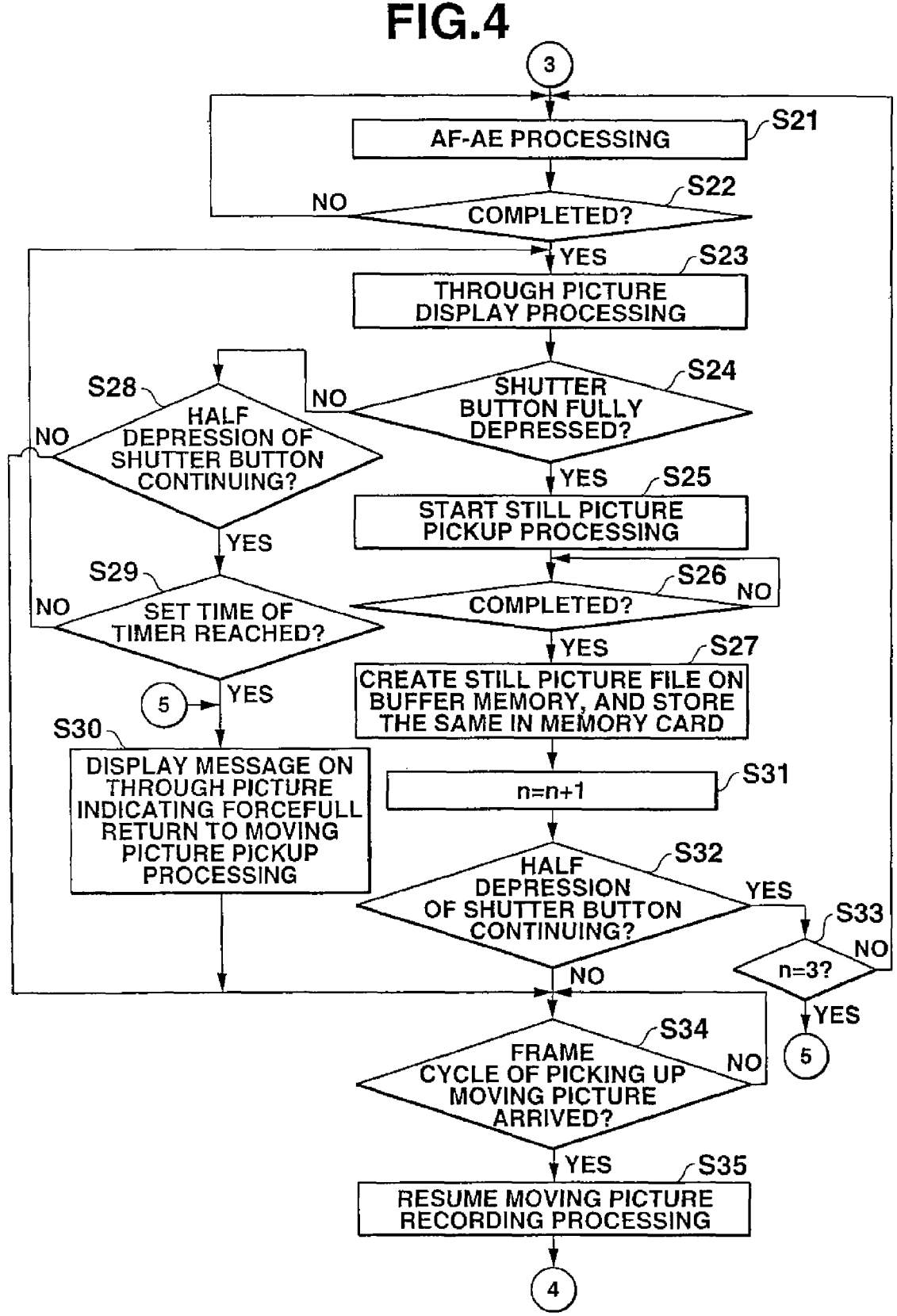
FIG. 4 is a flowchart continuing from the flowchart in FIG. 2.

Next, an operation that takes place in the digital camera 1 having the configuration described above will be described. FIGS. 2 through 4 are flowcharts of a processing procedure by the DSP/CPU 3 when the user sets a predetermined image pickup mode by operating the menu key.

When the image pickup mode is set, the DSP/CPU 3 begins imaging with the CCD 2 and displays a through picture of a subject on the display device 6 (step S1); the DSP/CPU 3 repeats a display processing to display the through picture until there is a user operation of the picture recording start button or a half depression of the shutter button (NO in both steps S2 and S3). Then, when the picture recording start button is subsequently operated (YES in step S2), the process shifts to a processing to pickup a moving picture with voices, which begins with step S14; when the shutter button is half-depressed (YES in step S3), the process shifts to a still picture pickup processing shown in steps S4-S13 in FIG. 3.

First, the still picture pickup processing will be described. In response to a half depression operation of the shutter button (YES in step S3), the DSP/CPU 3 sets image pickup conditions through an AF processing and an AE processing (step S4). When this is completed (YES in step S5), the DSP/CPU 3 provides a notice tone through the speaker of the voice processing section 8 and displays a notice such as a message on the display device 6 in order to notify the user that the setting has been completed (step S6), begins imaging with the CCD 2 using the image pickup conditions set, and displays a through picture on the display device 6 (step S7). As long as there is no full depression operation of the shutter button, and the half depression operation of the shutter button continues, the DSP/CPU 3 returns the processing to step S7 and continues to display the through picture (NO in step S8, YES in step S9).

When there is subsequently a full depression operation of the shutter button while the through picture is being displayed (YES in step S8), the DSP/CPU 3 outputs through the speaker of the voice processing section 8 a shutter-like sound stored in advance in the flash memory 11 (step S10), and begins the still picture pickup processing, such as imaging for recording purposes the subject picture with the COD 2 and creating the picture data of the subject picture (step S11). More specifically, the CCD 2 is caused to successively output pixel signals of even-numbered lines and pixel signals of odd-numbered lines for one screen in a relatively long output imaging timing, data of all the pixels is transferred to the buffer memory (the DRAM 10), and a processing to compress the picture data transferred is started. Once this is completed (YES in step S12), a still picture file (i.e., a file in JPEG format) is created based on the compressed picture data and stored in the memory card 13 (step S13). This concludes the still picture pickup processing, and the process returns to step S1. In other words, a still picture is picked up and stored according to an ordinary processing, similar to the processing in the normal still picture pickup mode. If the half depression of the shutter button is released while the through picture is being displayed (NO in step S9), the still picture pickup processing is terminated immediately at that point and the process returns to step S1.

Next, a moving picture pickup processing with voices will be described (see FIGS. 2 and 4). When the user operates the picture recording start button while the through picture is being displayed and immediately after the image pickup mode described above is set (YES in step S2), the DSP/CPU 3 begins a moving picture recording processing, in which pictures (moving picture frames) are picked up in a predetermined frame rate (a fixed cycle of 1/30 seconds) and stored in the buffer memory, and a voice recording processing, in which voices inputted into the built-in microphone of the voice processing section 8 are converted into voice data and stored in the buffer memory (step S14). When picking up the moving picture frames in the moving picture recording processing, the DSP/CPU 3 causes the CCD 2 to output pixel signals of only the odd-numbered lines of each screen in a relatively short output timing; transfers the pixel data of the odd-numbered lines to the buffer memory (the DRAM 10) and conduct a processing to thin out the picture data transferred into a predetermined number of pixels.

Subsequently, the through picture display processing (step S15), the moving picture recording processing and the voice recording processing are continued until the shutter button is half-depressed or the picture recording end button is operated (NO in both steps S16 and S17). When the picture recording end button is operated (YES in step S17), the moving picture data which have been developed in the buffer memory until then, i.e., a plurality of frame pictures that were imaged cyclically, and voice data are used to create a moving picture file with voices (e.g., a file in motion-JPEG format), which is stored in the memory card 13 (step S18). This concludes the moving picture pickup processing with voices for now, and the process returns to step S1. In other words, the moving pictures are recorded using the same processing as the processing in normal moving picture pickup mode with voices. When creating the moving picture file with voices, the voice data is divided in the direction of time axis in units of frames (i.e., in frame cycles) for filing or packetization, and at the same time synchronized with frame pictures according to timing information in the moving picture file header. Alternatively, voice files can be created independently from the moving picture files and the two can be correlated and stored.

Figure 5:
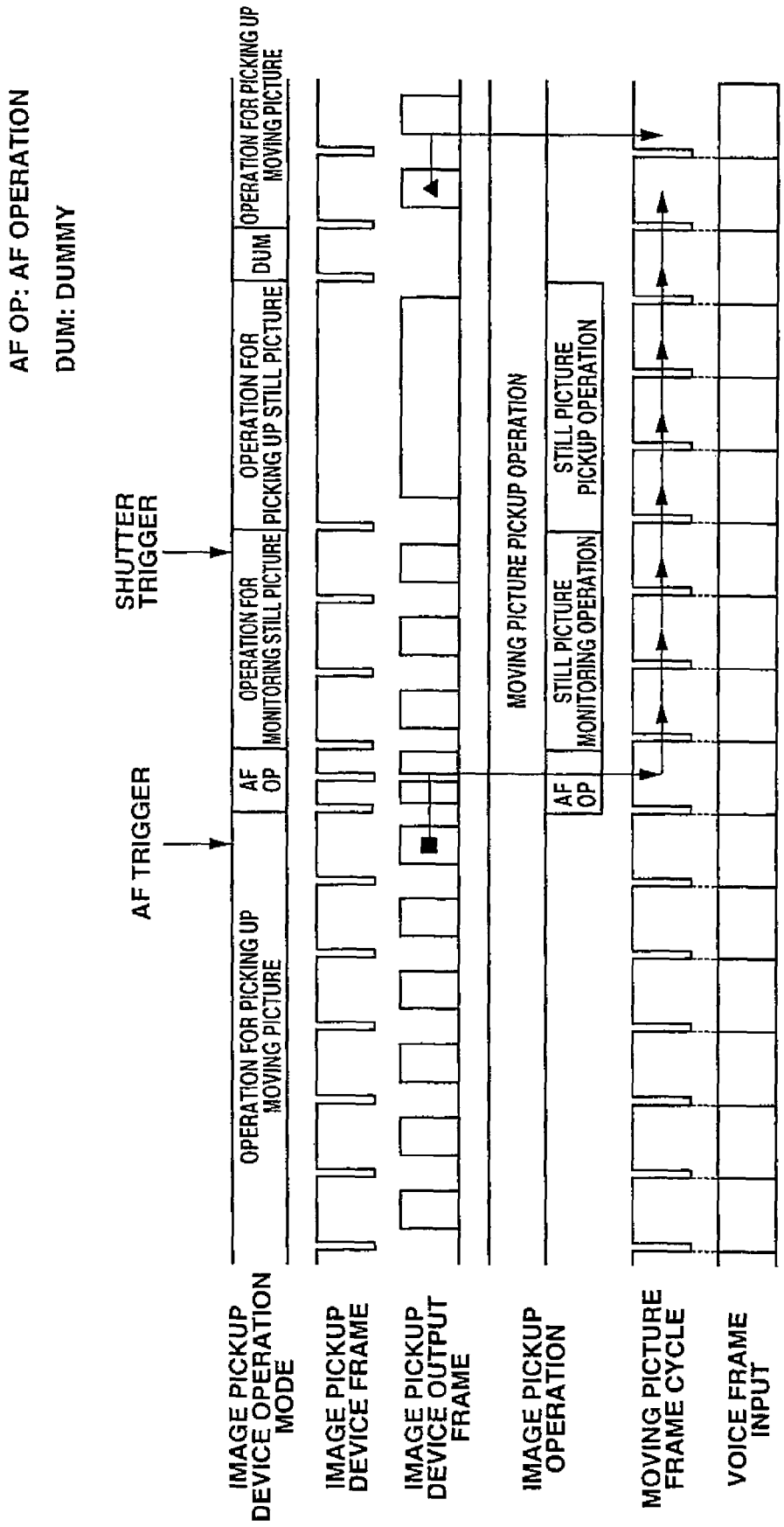
FIG. 5 is a timing chart when a moving picture is picked up by the digital camera.

On the other hand, if the shutter button is half-depressed while the through picture display processing, the moving picture recording processing and the voice recording processing are continuing (YES in step S16), the DSP/CPU 3 executes the following processing. FIG. 5 is a timing chart of the operation of the digital camera 1 that corresponds to the following processing.

First, the DSP/CPU 3 begins to measure the time elapsed and at the same time resets the value n of a counter for counting the number of pictures picked up to zero (step S19); when the moving picture frame cycle that is current then, i.e., at the time the shutter button is half-depressed (i.e., at the time the AF is triggered in FIG. 5), ends, the moving picture recording processing that began in step S14 is switched to a processing to repeatedly use frame data obtained immediately before the shutter button is half depressed ("Image Pickup Device Output Frames" in FIG. 5) (step S20).

In other words, the frame data, which are accumulated in the buffer memory in moving picture frame cycles while the still picture pickup processing is performed through an interrupt to be described later, are switched from frame data obtained through the image pickup operation to a copy of frame data obtained immediately preceding the half depression of the shutter button (hereinafter called "substitute frames"). However, the voice recording processing continues. Subsequently, the still picture pickup processing through an interrupt described in steps S21-S30 in FIG. 4 is executed.

First, an AF processing and an AE processing for picking up a still picture is executed based on image pickup signals outputted from the CCD 2, and image pickup conditions are set (step S21; "AF operation" in FIG. 5). Next, once the image pickup conditions are set (YES in step S22), imaging with the CCD 2 begins under the image pickup conditions set and a through picture is displayed, without outputting a notice tone or displaying a notice as in step S6 of the normal still picture pickup processing (step S23; "Still Picture Monitoring Operation" in FIG. 5). The notice display can be performed, however, since it does not affect the voice recording processing. Then, if there is subsequently a full depression operation of the shutter button (YES in step S24), a still picture pickup processing including a processing to image a subject picture with the CCD 2 for recording purposes and create picture data of the subject picture begins as in step S11 described above, but without performing an output processing to output the shutter-like sound as in step S10 of the normal still picture pickup processing (step S25; "Still Picture Image Pickup Operation" in FIG. 5); when this is finished (YES in step S26), a still picture file (i.e., a file in JPEG format) is created on the buffer memory based on the picture data, and stored in the memory card 13 (step S27), and the value of the counter indicating the number of pictures picked up is increased by one ("+1") to count up (step S31). This concludes the still picture pickup processing using an interrupt.

After the through picture is displayed in step S23 and until the shutter button is fully depressed (NO in step S24), if the half depression operation of the shutter button continues and if the elapsed time that began to be measured in step S19 has not reached a predetermined length of time, the process returns to step S23 and continues the through picture display processing (YES in step S28, NO in step S29). However, if the half depression operation of the shutter button is released during this time (NO in step S28), the still picture pickup processing through an interrupt is immediately terminated at this point. Further, if the elapsed time being measured reaches the predetermined length of time (e.g., 10 seconds) (YES in step S29), a message is displayed over the through picture that there will be a forced return to the moving picture recording processing (step S30) and the still picture pickup processing through an interrupt is terminated.

Next, if the shutter button is not half-depressed when the still picture image pickup operation is terminated (NO in step S32), the next moving picture frame cycle is awaited to arrive (a "dummy" period in FIG. 5); when the next moving picture frame cycle arrives (YES in step S34), the normal moving picture recording processing is resumed in a timing that matches the moving picture frame cycle preceding, i.e., synchronized with the moving picture frame cycle preceding (in step S35; "Moving Picture Pickup Operation" in FIG. 5). Subsequently, the process returns to step S15 in FIG. 2 described above and continues the through picture display processing, the moving picture recording processing and the voice recording processing until the picture recording end button is operated (NO in both steps S16 and S17); when the picture recording end button is operated (YES in step S17), the moving picture data, including the substitute frames, and voice data, both of which have been accumulated in the buffer memory until then, are used to create a moving picture file with voices, which is then stored in the memory card 13 (step S18).

This concludes the moving picture pickup processing with voices for now, and the process returns to step S1 and subsequently repeats the same operation until the image pickup mode is released. However, if the shutter button is half-depressed when the still picture pickup operation is concluded in step S27 (YES in step S32), whether the value of the counter indicating the number of pictures taken has reached a predetermined number, for example, "3" is determined in the subsequent step S33; if the value of the counter has not reached "3," the process shifts to a preparation processing that begins with step S21 for the still picture pickup processing, without resuming the moving picture recording processing.

On the other hand, if the value of the counter that indicates the number of pictures taken is determined to have reached "3" in step S33, the process shifts to step S30, where a message that there will be a forced return to the moving picture recording processing is displayed over the through picture and the still picture pickup processing through an interrupt is terminated.

As described above, according to the present embodiment, even when a still picture is recorded by performing a still picture pickup processing through an interrupt during a moving picture pickup operation, the moving pictures picked up are recorded as a single moving picture file as in the normal moving picture pickup operation. As a result, the moving picture file (or a moving picture file with voices) that has been recorded can be reproduced on other cameras or personal computers like ordinary moving picture files. In other words, the moving picture file according to the present embodiment is not onerous in use, nor its usage environment limited.

Furthermore, since a copy of frame data immediately preceding the interruption (substitute frames) is recorded even in a period during which the moving picture frame pickup operation is interrupted by the still picture pickup processing, and since the normal moving picture pickup processing is resumed in synchronization with the moving picture frame cycle preceding when the still picture pickup processing through an interrupt is finished, the reproduction time of the moving picture recorded can be perfectly matched to the actual image pickup time, which makes it easy to use. In particular, a more natural moving picture can be recorded when the interrupted time for a still picture image pickup operation is short.

In addition, since the voice recording processing continues even while the moving picture frame pickup operation is interrupted, when the moving pictures picked up are reproduced, actual voices can be heard in periods during which substitute frames are reproduced. Consequently, more natural moving pictures with voices can be picked up. Furthermore, due to the fact that outputs of notice tones or shutter-like sounds that are outputted in normal still picture pickup processing are prohibited in still picture pickup processing through an interrupt, the notice tones and shutter-like sounds would not be mixed in the recorded voices. As a result, moving pictures with high-quality voices can be recorded.

In the event the predetermined length of time has elapsed or the predetermined number of still pictures has been picked up from the time the moving picture pickup processing was suspended to the time the moving picture pickup processing was resumed, a forced return to the moving picture pickup processing is performed with a display of a message to that effect; consequently, the time the moving picture frame pickup operation (the moving picture pickup processing) is interrupted can be prevented with certainty from lengthening. As a result, even if the moving picture pickup operation is temporarily interrupted by the still picture pickup operation, more natural moving pictures with voices can be recorded, in which a substitute frame insert period, i.e. a period during which a picture is suspended at some point in the moving pictures, is not long and the user is hardly aware of it.

Although according to the present embodiment, the process is forcibly returned to the normal moving picture pickup processing with a message display when the predetermined length of time has elapsed or when the image pickup operation of a predetermined number of still pictures has been completed (steps S29, S30, S33, S34 and S35 in FIG. 4), a message display (or a notice tone such as an alarm) can be performed by itself to urge the user to perform a still picture pickup operation or an operation to return to the moving picture pickup operation, or the moving picture pickup processing can be resumed without any message displays. Alternatively, a message can be displayed first, followed by a forced return to the normal moving picture pickup processing when a certain length of time has elapsed.

Moreover, when a still picture pickup operation is performed during a moving picture pickup operation and if the shutter button is half-depressed at the end of the still picture pickup operation (YES in step S32; NO in step S33), the still picture pickup operation is repeated (i.e., performed consecutively) without resuming the moving picture pickup processing; this further contributes to the ease of use.

Although, in the present embodiment, the present invention is applied to a mode of picking up moving pictures with voices, the present invention can also be applied to a mode of picking up a moving picture without voices, as in a second embodiment to be described below.

Second Embodiment

Next, a second embodiment of the present invention is described. The present embodiment relates to a situation in which the present invention is applied to picking up a moving picture without voices.

Figure 6:
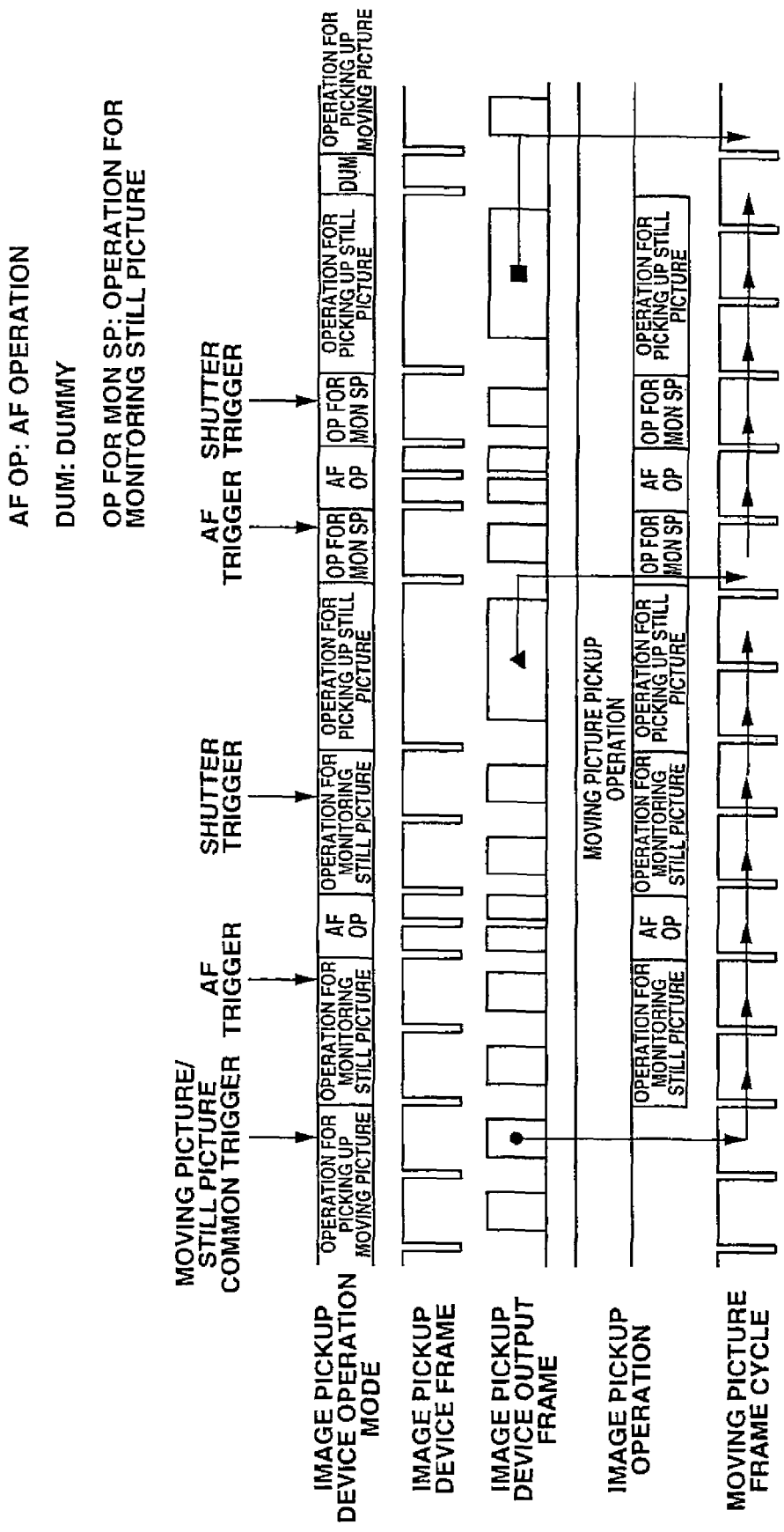
FIG. 6 is a timing chart when a moving picture is picked up in accordance with a second embodiment of the present invention.

Below, referring to a timing chart in FIG. 6, an operation in a moving picture pickup mode of a digital camera having the same configuration as that shown in FIG. 1 will be described. In the present embodiment, there is provided a moving picture pickup mode, in which still picture pickup operations can be performed consecutively only twice in one interrupt processing during a moving picture pickup operation, and a program required for this operation is stored in a built-in flash memory 11.

When the user presses a predetermined button of a key input section 7 during a moving picture pickup processing, a digital camera 1 considers it a moving picture/still picture common trigger and switches from the (normal) moving picture pickup processing that had been taking place up to that point to a processing to repeatedly use frame data immediately preceding ("Image Pickup Device Output Frames" in FIG. 6) the pressing of the predetermined button. Subsequently, substitute frames, which are a copy of moving picture frame data obtained immediately preceding the pressing of the predetermined button, are accumulated in moving picture frame cycles in a buffer memory. Then, the process shifts to a still picture pickup mode through an interrupt, where a still picture monitoring operation is performed and a through picture is displayed on a display device 6.

If there is subsequently a half depression of the shutter button in this state, it is determined as an AF trigger that leads to an AF processing and an AE processing for the still picture pickup operation ("AF operation" in FIG. 6); if there is subsequently a full depression operation of the shutter button, it is determined as a shutter trigger that leads to a normal still picture pickup processing, in which a still picture file is created in the buffer memory and stored in a memory card 13. Also, at this point, moving picture frame data is created from the still picture data in the buffer memory, and a processing to use the moving picture frame data obtained immediately preceding the suspension of the moving picture pickup processing is switched to a processing to use the frame data created as the new substitute frames. Next, the still picture monitoring operation is resumed; after the second still picture pickup operation using the same procedure is performed, the still picture pickup processing through one interrupt is ended.

When the still picture pickup processing through an interrupt is ended, the arrival of the moving picture pickup frame cycle is awaited (a "dummy" period in FIG. 6) and the normal moving picture pickup processing is resumed when it arrives. However, instead of waiting for new moving picture frames to be obtained through the moving picture pickup operations by a CCD 2 to use as moving picture frames immediately following the resumption, frame data created from the picture data in the buffer memory that was obtained in the second still picture pickup operation is used. After the normal moving picture pickup processing is resumed and when the picture recording end button is pressed, frame data that contain the two types of substitute frames and that are accumulated in the buffer memory up to that point are used to create a moving picture file, which is stored in the memory card 13.

As a result, even if still pictures are recorded by performing a still picture pickup processing through an interrupt during a moving picture pickup operation, the moving picture frames picked up are recorded as a single moving picture file as in normal moving picture pickup operation, also according to the present embodiment. Consequently, the moving picture file (i.e., a moving picture file without voices) that has been recorded can be reproduced on other cameras or personal computers like normal moving picture files. Therefore, an effect similar to the effect in the first embodiment can be obtained.

In accordance with the present embodiment, unlike the first embodiment, the substitute frames, which are stored in a period during which the moving picture frame pickup operation is interrupted by the still picture pickup processing, consist of a copy of frame data obtained immediately preceding the interruption of the moving picture frame pickup operation before the still picture pickup processing is ended, and of frame data created from the still pictures picked up after the still picture pickup operation is ended. Even in this case, the reproduction time of the moving pictures recorded can be perfectly matched to the actual photographing time, which makes it easy to use. In particular, this makes it possible to record more natural moving pictures when the interrupted time for the still picture photographing is short. Alternatively, substitute frames used in the period during which the moving picture pickup processing is interrupted can consist only of substitute frames created from still picture data obtained through the still picture pickup processing, or consist only of moving picture frame data obtained immediately preceding the suspension of the moving picture pickup processing.

The present embodiment indicates a situation in which a moving picture pickup mode, which allows still picture pickup operations consecutively only twice in one interrupt processing during a moving picture pickup operation, is provided. However, frame data that contain two types of substitute frames as in the present embodiment can be used to create a moving picture file, which is then stored, even in a mode in which still picture pickup operations can be performed consecutively unlimited number of times in one interrupt processing, as in the first embodiment. In such a case, even if the period during which the moving picture frame pickup operation is interrupted is long, because a plurality of still picture pickup operations take place consecutively in one interrupt processing during a moving picture pickup operation, the movement of the subject can be expressed using a plurality of types of substitute frames, which have different contents created from still pictures, when the moving pictures picked up are reproduced. As a result, even more natural moving pictures can be recorded.

Furthermore, also in the present embodiment, if the predetermined length of time has elapsed after shifting to the still picture pickup processing through an interrupt and before resuming the normal moving picture pickup processing, a forced return to the normal moving picture pickup processing can be performed along with a message to that effect.

Third Embodiment

Next, a third embodiment of the present invention will be described. The present embodiment relates to a situation in which the present invention is applied to a digital camera having a consecutive picture pickup function.

The following is a description of an operation in a predetermined image pickup mode of a digital camera having the same configuration as the one shown in FIG. 1. In the present embodiment, there is provided a moving picture pickup mode, in which consecutive pictures can be picked up in one interrupt processing during a moving picture pickup operation, and a program required for this operation is stored in a built-in flash memory 11.

Figure 7:
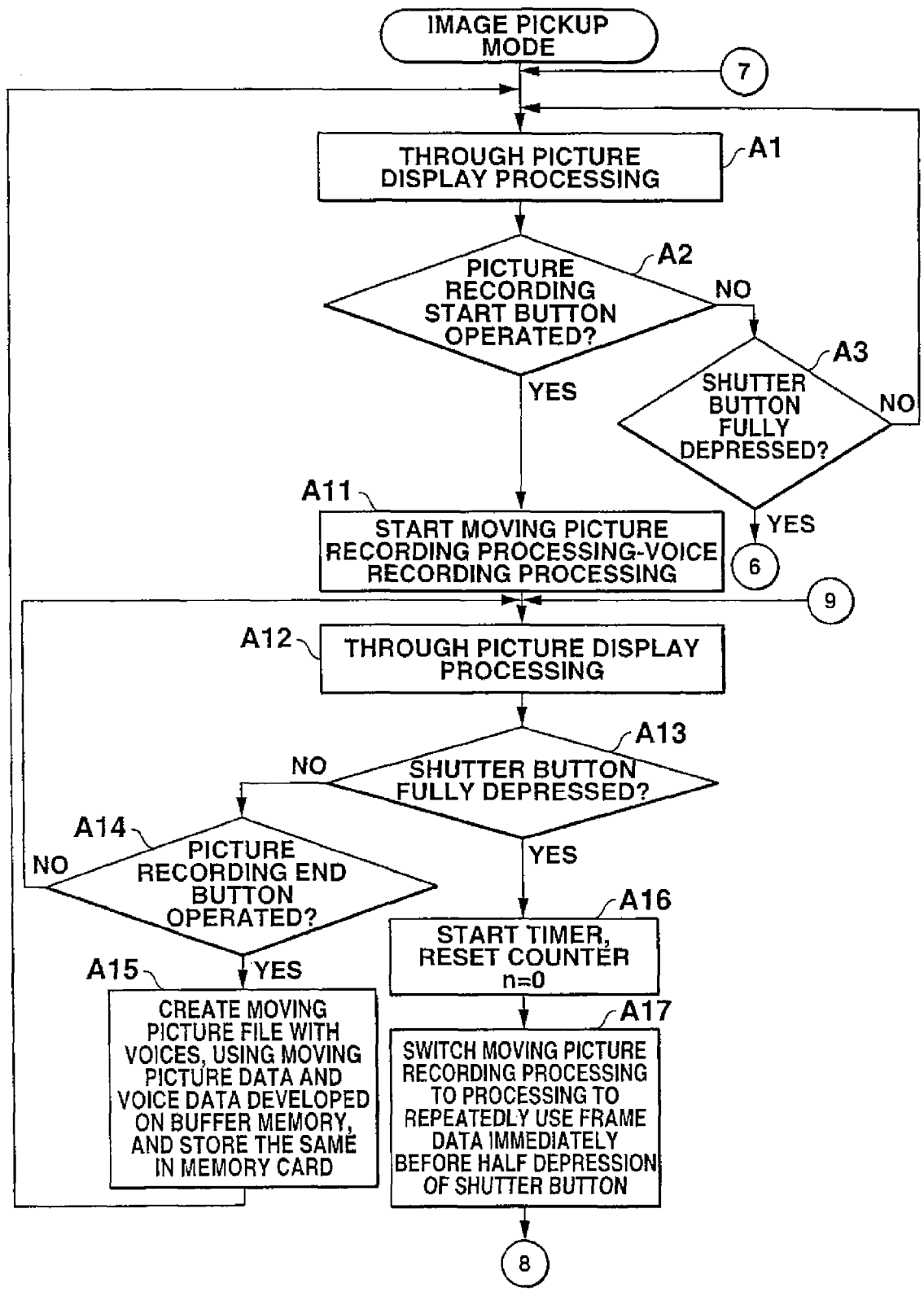
FIG. 7 is a flowchart of an operation in an image pickup mode in accordance with a third embodiment of the present invention.
Figure 8:
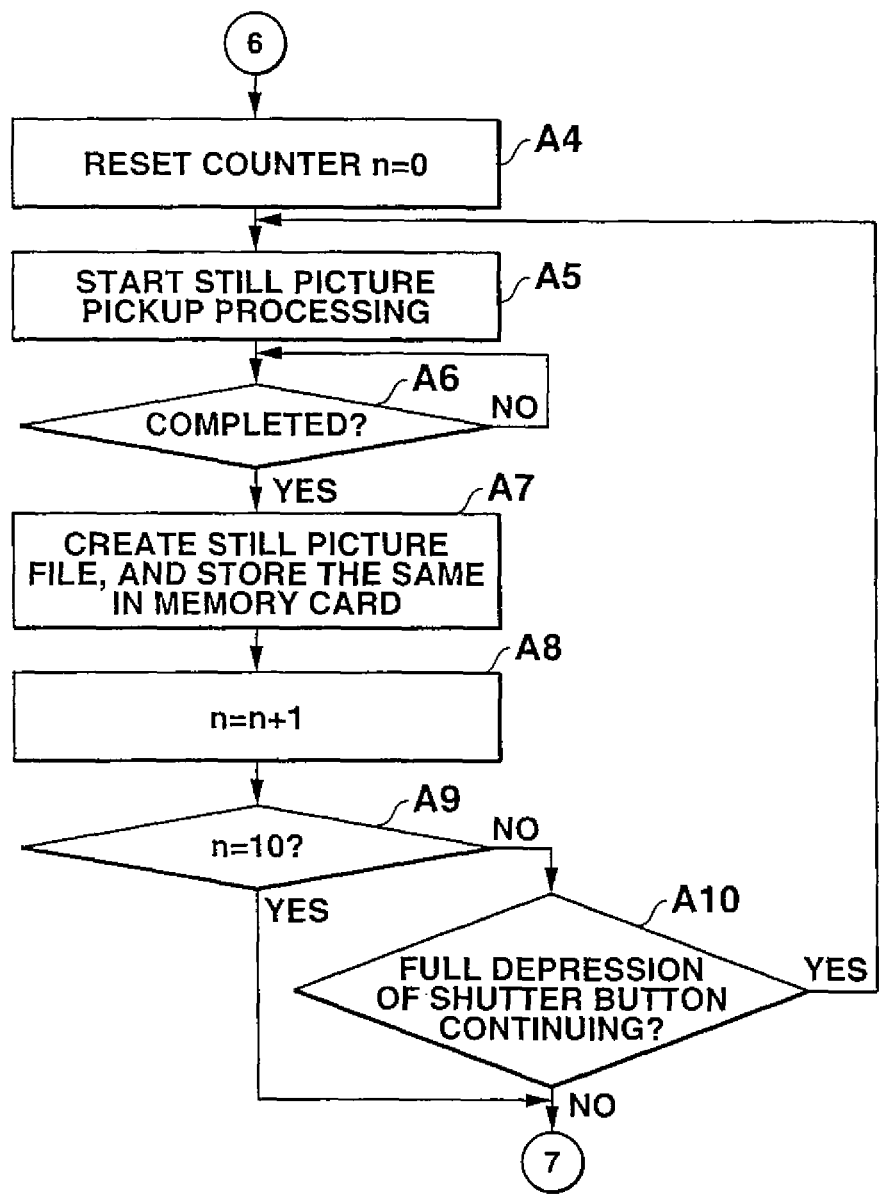
FIG. 8 is a flowchart continuing from the flowchart in FIG. 7.
Figure 9:
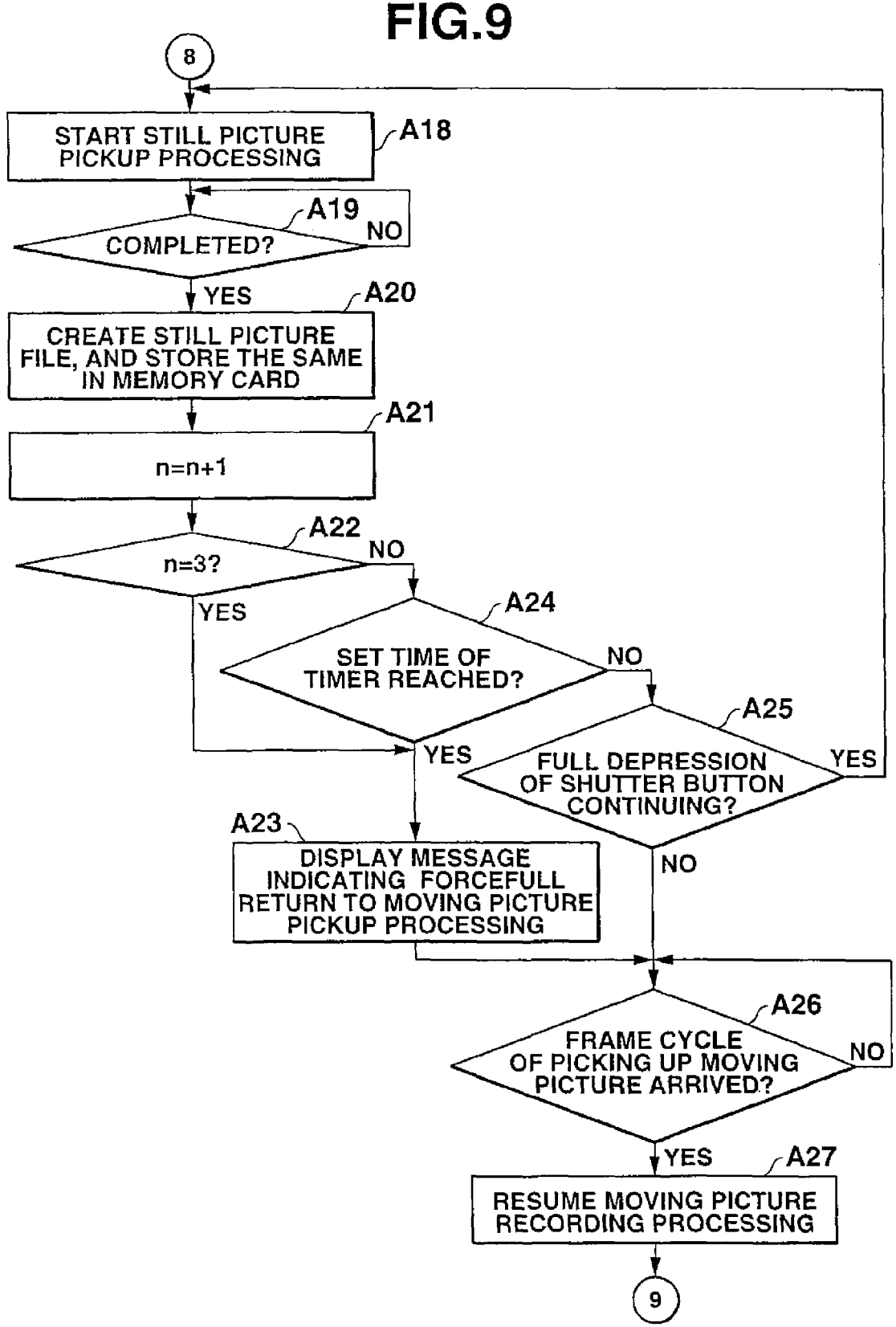
FIG. 9 is a flowchart continuing from the flowchart in FIG. 7.

FIGS. 7 through 9 are flowcharts of a processing procedure by a DSP/CPU 3 that takes place when a user operates a menu key and sets a predetermined image pickup mode.

When the image pickup mode is set, the DSP/CPU 3 begins picking up pictures with a CCD 2 and displays a through picture of a subject on a display device 6 (step A1); and repeats a display processing of the through picture until there is a user operation of a picture recording start button or a half depression of the shutter button (NO in both steps A2 and A3). When the picture recording start button is subsequently operated (YES in step A2), the process shifts to a processing to pickup a moving picture with voices that begins with step A11; when the shutter button is fully depressed (YES in step A3), the process shifts to a processing to pickup still pictures shown in steps A4-A10 in FIG. 8.

The still picture pickup processing will be described. In response to the full depression of the shutter button (YES in step A3), the DSP/CPU 3 first resets the value of a counter for counting the number of pictures to zero (step A4), then begins the still picture pickup processing, such as imaging for recording purposes the subject picture with the CCD 2 and creating picture data of the subject picture (step A5). More specifically, the CCD 2 is caused to alternately output pixel signals of even-numbered lines and pixel signals of odd-numbered lines for one screen in a relatively long output imaging timing, data of all pixels is transferred to a buffer memory (a DRAM 10), and a processing to compress the picture data transferred is started. Once this is completed (YES in step A6), a still picture file (e.g., a file in JPEG format) is created based on the compressed picture data, and stored in the memory card 13 (step A7). After the still picture pickup processing is concluded, the value of the counter indicating the number of pictures picked up is increased by one ("+1") to count up (step A8), and a determination is made in a succeeding step A9 as to whether the counter value indicating the number of pictures picked up has reached a predetermined value, for example, "10," in other words, whether the number of consecutive pictures picked up has reached "10". If it is determined that the counter value has reached "10," a forced ending of the consecutive picture pickup processing is immediately performed at that point and the process returns to the through picture display processing in step A1.

If it is determined in step A9 that the counter value has not reached 10, the process proceeds to step A10 and a determination is made as to whether or not the full depression of the shutter button is continuing. If it is determined that the full depression of the shutter button has been released (NO in step A10), the consecutive picture pickup processing is immediately ended at that point and the process returns to the through picture display processing in step A1.

On the other hand, if it is determined in step A10 that the full depression of the shutter button is continuing (YES in step A10), the process returns to step A5 and begins the still picture pickup processing; the consecutive picture pickup processing is continued by repeating the processing in steps A5-A8 until it is determined in step A9 that the counter value has reached "10" or until it is determined in step A10 that the full depression of the shutter button has been released. However, if the time between the time the shutter button is fully depressed and the time the full depression of the shutter button is released is extremely short, the still picture pickup processing is executed only once (i.e., a single picture pickup processing), instead of consecutive picture pickup processing.

Next, a moving picture pickup processing with voices (see FIGS. 7 and 9) will be described. When the user operates the picture recording start button while the through picture is being displayed and immediately after the image pickup mode is set (YES in step A2), the DSP/CPU 3 begins a moving picture recording processing, in which pictures (moving picture frames) are imaged at a predetermined frame rate (e.g., a fixed cycle of 1/30 seconds) and stored in the buffer memory, and a voice recording processing, in which voices inputted into a built-in microphone of an voice processing section 8 is converted into voice data and stored in the buffer memory (step A11). To pickup the moving picture frames in the moving picture recording processing, the DSP/CPU 3 causes the CCD 2 to output pixel signals of only the odd-numbered lines of each screen in a relatively short output timing; transfer the pixel data of the odd-numbered lines to the buffer memory (the DRAM 10), and perform a processing to thin out the transferred picture data into a predetermined number of pixels.

Subsequently, the DSP/CPU 3 continues the through picture display processing (step A12), the moving picture recording processing and the voice recording processing, until the shutter button is fully depressed or the picture recording end button is operated (NO in both steps A13 and A14). When the picture recording end button is operated (YES in step A14), the DSP/CPU 3 uses the moving picture data, i.e., a plurality of frame pictures that were picked up cyclically, which have been developed on the buffer memory until then, and voice data, to create a moving picture file with voices (e.g., a file in motion-JPEG format), and stores it in the memory card 13 (step A15). This concludes the moving picture pickup processing with voices for now, and the process returns to step A1. In other words, the moving picture is recorded using the same processing as the processing in a normal moving picture pickup mode with voices. When creating the moving picture file with voices, the voice data is divided in the direction of time axis in units of frames (i.e., in frame cycles) for filing or packetization, and at the same time the voice data is synchronized with frame pictures according to timing information in the moving picture file header. Alternatively, voice files can be created independently from the moving picture files and the two can be correlated and stored.

On the other hand, if the shutter button is fully depressed while the through picture display processing, the moving picture recording processing and the voice recording processing are continuing (YES in step A13), the DSP/CPU 3 executes the following processing.

First, the DSP/CPU 3 begins to measure the time elapsed and at the same time resets the value n of the counter for counting the number of pictures to zero (step A16); when the moving picture frame cycle that is current then, i.e., at the time the shutter button is fully depressed, ends, the DSP/CPU 3 switches from the moving picture recording processing that began in step A11 to a processing to repeatedly use frame data obtained immediately preceding the full depression of the shutter button (step A17). In other words, the frame data, which are accumulated in the buffer memory in moving picture frame cycles while the still picture pickup processing through an interrupt (i.e., consecutive picture pickup processing) to be described below is performed, are switched from frame data obtained through the image pickup operation to a copy of frame data obtained immediately preceding the full depression of the shutter button (hereinafter called "substitute frames"). However, the voice recording processing continues. Subsequently, the still picture pickup processing through an interrupt (i.e., the consecutive picture pickup processing) described in steps A18-A27 in FIG. 9 is executed.

First, as in step A5 described above, the still picture pickup processing such as imaging a subject picture for recording purposes with the CCD 2 is started and picture data of the subject picture (step A18) is created; when this is finished (YES in step A19), a still picture file (e.g., a file in JPEG format) is created on the buffer memory based on the picture data and stored in the memory card 13 (step A20), and the value of the counter indicating the number of photographs is increased by one ("+1") to count up (step A21). In the next step A22, a determination is made as to whether or not the counter value indicating the number of pictures picked up has reached a predetermined value, for example, "3," in other words, whether or not the number of consecutive pictures has reached 3; if it is determined that the counter value has reached "3," a message is displayed over the through picture, indicating that there will be a forced return to the moving picture recording processing (step A23), and the consecutive picture pickup processing through an interrupt processing is ended. The maximum number of consecutive pictures in the consecutive picture pickup processing through an interrupt processing is set to three pictures in this embodiment, which is less than the maximum 10 consecutive pictures in the normal consecutive picture pickup processing, in order to shorten the length of interrupted time in the moving picture pickup processing as much as possible in the present embodiment.

On the other hand, if it is determined in step A22 that the number of consecutive pictures has not reached "3," the process proceeds to step A24, where a determination is made as to whether or not the elapsed time whose measurement began in step A16 has reached the predetermined length of time. If it is determined that the elapsed time has reached the predetermined length of time (for example, 10 seconds) (YES in step A24), a message is displayed over the through picture indicating that there will be a forced return to the moving picture recording processing (step A23) and the consecutive picture pickup processing through an interrupt processing is ended.

If it is determined in step A24 that the elapsed time has not reached the predetermined length of time, the process proceeds to step A25, where it is determined whether not the full depression operation of the shutter button is continuing; if it is determined that the full depression of the shutter button has been released (NO in step A25), the consecutive picture pickup processing through an interrupt processing is immediately terminated at that point.

If it is determined in step A25 that the full depression operation of the shutter button is continuing (YES in step A25), the process returns to step A18 and begins the still picture pickup processing. Subsequently, the consecutive picture pickup processing is continued by repeating the processing in steps A18-A21 until it is determined in step A22 that the counter value has reached "3," or it is determined in step A24 that the elapsed time has reached the predetermined length of time, or it is determined in step A25 that the full depression of the shutter button has been released. However, if the time between the time the shutter button is fully depressed and the time the full depression is released is extremely short, the still picture pickup processing is executed only once (i.e., a single pickup processing) instead of consecutive picture pickup processing.

If it is determined in step A22 that the counter value has reached "3," or if it is determined in step A24 that the elapsed time has reached the predetermined length of time, or if it is determined in step A25 that the full depression of the shutter button has been released, the process proceeds to step A26 and waits for the next moving picture frame cycle to arrive. When the next moving picture frame cycle arrives (YES in step A26), the normal moving picture recording processing is resumed in a timing that matches the moving picture frame cycle preceding, i.e., synchronized with the moving picture frame cycle preceding (step A27). Subsequently, the process returns to step A12 in FIG. 7 and continues the through picture display processing, the moving picture recording processing and the voice recording processing until the picture recording end button is operated (NO in both steps A13 and A14). When the picture recording end button is operated (YES in step A14), a moving picture file with voices is created, using the moving picture data, including the substitute frames, and voice data, both of which have been accumulated in the buffer memory until then, and stores the same in the memory card 13 (step A15).

This concludes the moving picture pickup processing with voices for now and the process returns to step A1 and subsequently repeats the same operation until the image pickup mode is released.

As described above, in accordance with the present embodiment, the still picture pickup processings can be consecutively executed, i.e., since the consecutive picture pickup processing can be executed, by continuing the full depression operation of the shutter button. As a result an effect of drastically shortening the interrupted time during a moving picture pickup processing can be obtained, when the user wants to pickup a plurality of still pictures through an interrupt processing.

Fourth Embodiment

Next, a fourth embodiment of the present invention will be described. According to the present embodiment, a moving picture pickup processing continues even after AF and AE processing are started with a half depression operation of a shutter button, and the moving picture pickup processing is suspended when an operation to pickup a still picture is instructed with a full depression operation of the shutter button.

The following is a description of an operation in a predetermined image pickup mode of a digital camera having the same configuration as the one shown in FIG. 1

Figure 10:
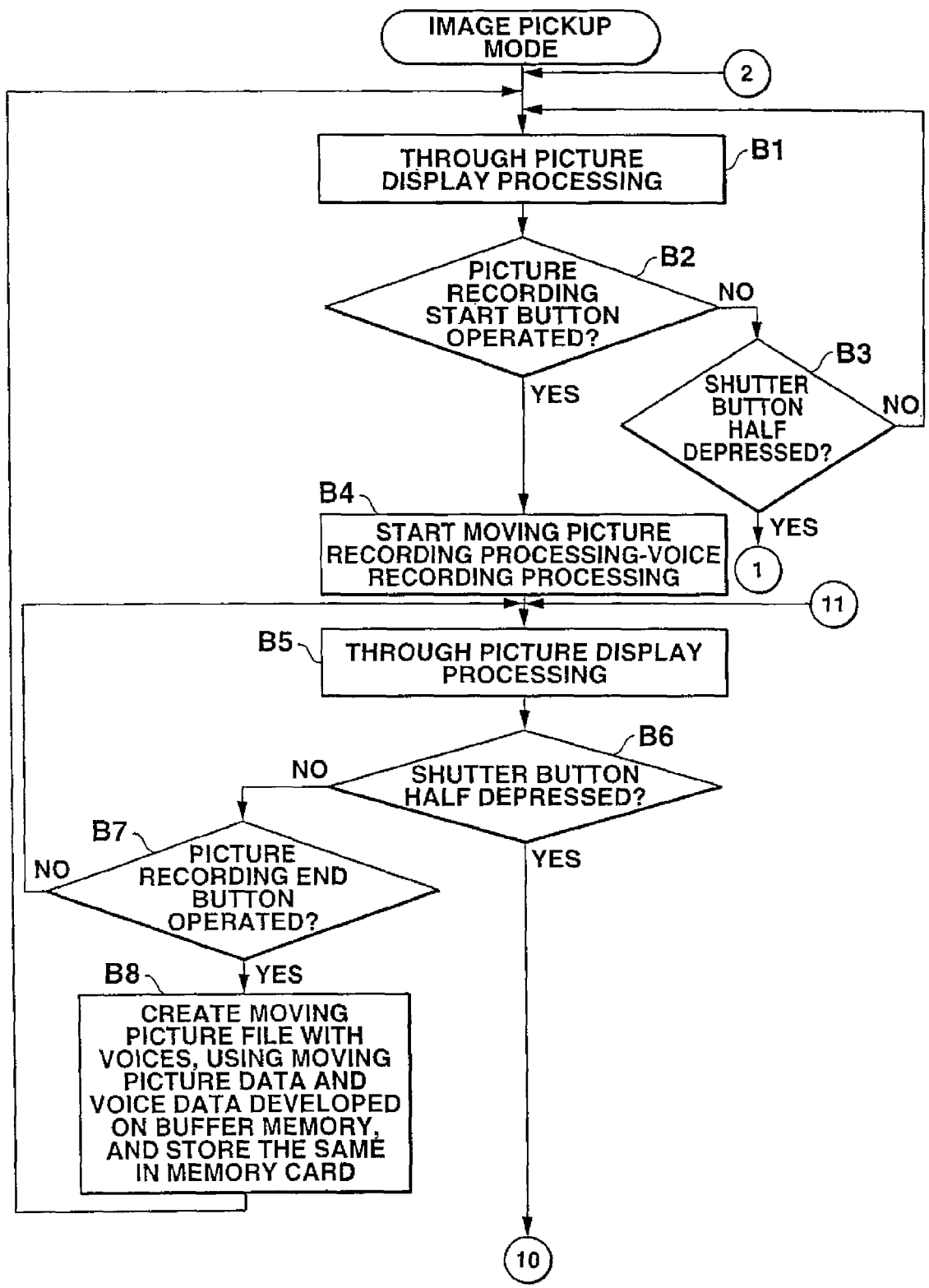
FIG. 10 is a flowchart of an operation in an image pickup mode in accordance with a fourth embodiment of the present invention.
Figure 11:
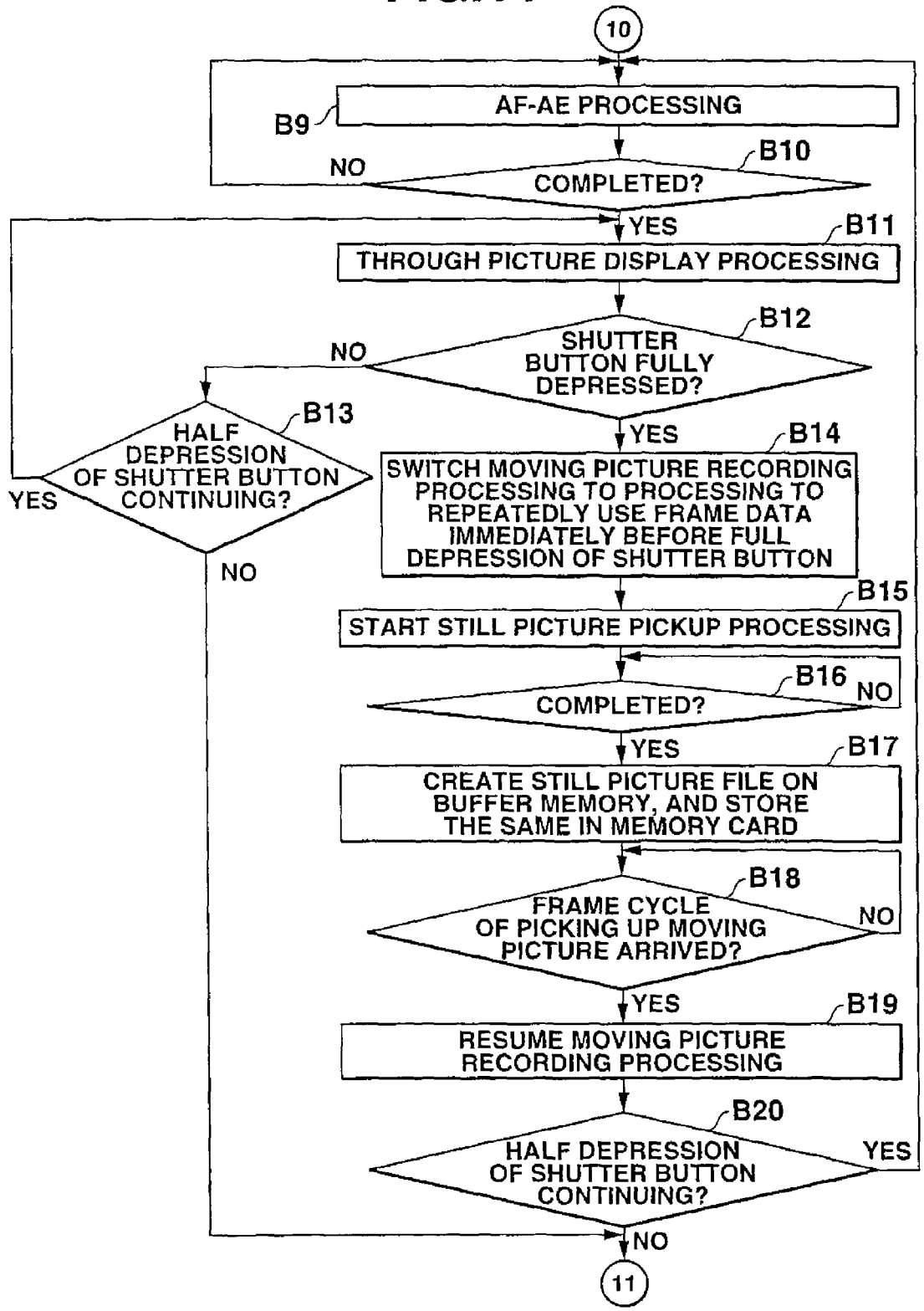
FIG. 11 is a flowchart continuing from the flowchart in FIG. 10.

FIGS. 10 and 11 are a flowchart of a processing procedure by a DSP/CPU 3 that takes place when the user operates a menu key and sets a predetermined image pickup mode.

When the image pickup mode is set, the DSP/CPU 3 begins imaging with a CCD 2 and displays a through picture of a subject on a display device 6 (step B1); and repeats a display processing of the through picture until there is an operation of a picture recording start button or a half depression operation of a shutter button (NO in both steps B2 and B3). When the picture recording start button is subsequently operated (YES in step B2), the process shifts to a processing to pickup a moving picture with voices that begins with step B4; when the shutter button (YES in step B3) is half-depressed, the process shifts to a still picture pickup processing shown in steps S4-S13 in FIG. 3.

When the user operates the picture recording start button while the through picture is being displayed and immediately after the image pickup mode is set (YES in step B2), the DSP/CPU 3 begins a moving picture recording processing, in which pictures (moving picture frames) are picked up at a predetermined frame rate (a fixed cycle of 1/30 seconds) and stored in a buffer memory, and a voice recording processing, in which voices inputted into a built-in microphone of an voice processing section 8 is converted into voice data and stored in the buffer memory (step B4). To pickup the moving picture frames in the moving picture recording processing, the DSP/CPU 3 causes the CCD 2 to output pixel signals of only the odd-numbered lines of each screen in a relatively short output timing; transfers the pixel data of the odd-numbered lines into the buffer memory (a DRAM 10) and performs a processing to thin out the picture data transferred into a predetermined number of pixels.

Subsequently, the DSP/CPU 3 continues the through picture display processing (step B5), the moving picture recording processing and the voice recording processing until the shutter button is half-depressed or the picture recording end button is operated by the user (NO in both steps B6 and B7). When the picture recording end button is operated (YES in step 137), a moving picture file with voices (i.e., a file in motion-JPEG format) is created, using the moving picture data, i.e., a plurality of frame pictures that were picked up cyclically, and voice data, both of which have been developed in the buffer memory until then, and stored in a memory card 13 (step B8). This concludes the moving picture pickup processing with voices for now, and the process returns to step B1. In other words, the moving picture is recorded using the same processing as the processing in the normal moving picture image pickup mode with voices. When the moving picture file with voices is created, the voice data is divided in the direction of time axis in units of frames (i.e., in frame cycles) for filing or packetization, and at the same time the voice data is synchronized with frame pictures according to timing information in the moving picture file header. Alternatively, voice files can be created independently from the moving picture files and the two can be correlated and stored.

On the other hand, if there is a half-depression operation of the shutter button while the through picture display processing, the moving picture recording processing and the voice recording processing are continuing (YES in step B6), the DSP/CPU 3 shifts the process to step B9 in FIG. 11 without suspending the through picture display processing, the moving picture pickup processing and the voice recording processing, and executes the following processing.

First, the DSP/CPU 3 executes an AF processing and an AE processing for a still picture pickup operation based on imaging signals outputted from the CCD 2 and sets image pickup conditions (step B9). Next, once setting of the image pickup conditions (YES in step 1310) is completed, the DSP/CPU 3 begins imaging with the CCD 2 under the image pickup conditions set and displays a through picture, without sounding a notice tone or displaying a notice as in step S6 of the normal still picture pickup processing (step B11). The notice display may be performed, however, since it does not affect the voice recording processing. As long as there is no full depression operation of the shutter button and the half depression operation of the shutter button continues, the process returns to step B11 and continues the through picture display processing (NO in step B12, YES in step B13). When it is determined in step B13 that the half depression operation of the shutter button has been released, the process returns to step 135 in FIG. 10 and continues the through picture display processing, the moving picture recording processing and the voice recording processing until the picture recording end button is operated.

If there is a full depression operation of the shutter button while the through picture is being displayed (YES in step B12), when the moving picture frame cycle that is current then, i.e., at the time the shutter button is fully depressed, ends, the moving picture recording processing that began in step 134 is switched to a processing to repeatedly use frame data obtained immediately preceding the full depression of the shutter button, without performing a processing to output a shutter-like sound in step S10 in the normal still picture pickup processing (step B14). In other words, the frame data, which are accumulated in the buffer memory in moving picture frame cycles while the still picture pickup processing through an interrupt to be described later is performed, are switched from frame data obtained through imaging to a copy of frame data obtained immediately preceding the full depression of the shutter button (hereinafter called "substitute frames"). However, the voice recording processing continues. Subsequently, as in step S11 described above, the DSP/CPU 3 begins the still picture pickup processing, such as imaging for recording purposes the subject picture with the CCD 2 and creating the picture data of the subject picture, (step B15); when this is finished (YES in step B16), the DSP/CPU 3 creates in the buffer memory a still picture file (i.e., a file in JPEG format) based on the picture data and stores it in the memory card 13 (step B17). This concludes the still picture pickup processing through an interrupt.

Next, the process waits for the next moving picture frame cycle to arrive; when the next moving picture frame cycle arrives (YES in step B18), the normal moving picture recording processing (the moving picture pickup processing) is resumed in a timing that matches the moving picture frame cycle preceding, i.e., synchronized with the moving picture frame cycle preceding (step B19).

If the shutter button is half-depressed when the moving picture recording processing is resumed in step B19 (YES in step B20), the process returns to step B9 to execute the AF and AE processing and repeats the processing in steps B9-B20 described earlier.

If it is determined in step B20 that the shutter button has not been half-depressed, the process returns to step B5 in FIG. 10 and continues the through picture display processing, the moving picture recording processing and the voice recording processing until the picture recording end button is operated (NO in both steps B6 and B7); when the picture recording end button is operated (YES in step B7), a moving picture file with voices is created, using the moving picture data, including the substitute frames, and voice data, both of which have been accumulated in the buffer memory until then, and stored in the memory card 13 (step B8).

This concludes the moving picture pickup processing with voices for now, and the process returns to step B1 and subsequently repeats the same operation until the image pickup mode is released.

As described above, according to the present embodiment, due to the fact that the moving picture pickup processing can be continued without being suspended even after the AF and AE processing are executed through a half depression operation of the shutter button and until imaging of a still picture is instructed through a full depression operation of the shutter button, the interrupted time in the moving picture pickup processing can be drastically shortened.

Although the present embodiment is configured such that the AF and AE processing are executed when the shutter button is half-depressed during a moving picture pickup operation, and a still picture pickup processing through an interrupt is executed when the shutter button is subsequently fully depressed, the configuration may be such that the half depression operation of the shutter button (i.e., the AF trigger) is not detected and only the full depression operation thereof (i.e., the shutter trigger) is detected to execute the AF and AE processing and the still picture pickup processing simply when the shutter button is pressed during the moving picture pickup operation.

Furthermore, in the first through fourth embodiments, frame data immediately preceding a shift to a still picture pickup operation or frame data (substitute frames) obtained from the still picture pickup operation are repeatedly used (i.e., copied) in moving picture pickup frame cycles in order to continue recording moving picture data in the buffer memory while a moving picture pickup processing is suspended. However, the processing related to the moving picture pickup operation may be completely suspended while the moving picture pickup processing is suspended, and the substitute frames can be inserted after the moving picture pickup operation is ended into parts where the moving picture pickup processing was suspended.

In addition, although in the first through fourth embodiments, substitute frames are inserted into missing parts resulting from the interruption of the moving picture pickup operation, moving picture data before and after a still picture pickup processing can be directly connected to each other instead of inserting the substitute frames in between in order to create one moving picture file.

In the first through fourth embodiments, frame data immediately preceding the suspension of the moving picture pickup processing or substitute frames obtained from the still picture pickup operation are inserted into missing parts of moving picture data. Instead, however, frame data immediately following the resumption of the moving picture pickup processing can be inserted into the missing parts, or frame data created by compositing a plurality of frame data in a predetermined ratio can be inserted into missing parts of moving picture data, or frame data to be inserted into missing parts can be changed in stages with other different frame data.

In the first through fourth embodiments, a dummy period is provided to delay the timing to resume the moving picture pickup processing in order to synchronize the timing to resume the moving picture pickup processing with moving picture pickup cycle; however, a moving picture pickup processing can be started without delay and immediately after ending a still picture pickup processing.

Although the present invention is applied to an electronic still camera with moving picture pickup function in the first through fourth embodiments, the present invention can also be applied to a movie camera with still picture pickup function, a portable telephone with camera, a PDA with camera or a personal computer with camera; in other words, the present invention can be applied to any equipment as long as it has both a moving picture pickup function and a still picture pickup function.

What is claimed is:

1. An image pickup device comprising:
an imaging section that executes a moving picture pickup processing and a still picture pickup processing;
a voice recording section that executes a voice recording processing in parallel with the moving picture pickup processing;
an interrupt processing section that sequentially executes, during the moving picture pickup processing by the imaging section, a processing to suspend the moving picture pickup processing by the imaging section, a processing to pickup a still picture by the imaging section, and a processing to resume the moving picture pickup processing by the imaging section,
wherein the interrupt processing section continually executes the voice recording processing executed by the voice recording section in parallel with the moving picture pickup processing before the moving picture pickup processing is suspended, until the moving picture pickup processing is resumed;
a sound output section that outputs a notice tone before the still picture pickup processing by the imaging section, and
a notice tone control section that prohibits a sound output section from outputting a notice tone when the imaging section picks up a still picture in accordance with the interrupt processing and allows the sound output section to output a notice tone when the imaging section picks up a still picture independently of the interrupt processing.

2. An image pickup device according to claim 1, further comprising
an image pickup preparation instruction section that instructs an execution of at least one of an auto focus processing and an auto iris processing for the still picture pickup processing, and
an image pickup preparation control section that executes at least one of the auto focus processing and the auto iris processing, when the image pickup preparation instruction section instructs an execution of at least one of the auto focus processing and the auto iris processing,
wherein the sound output section outputs a notice tone along with at least one of the auto focus processing and the auto iris processing.

3. An image pickup device according to claim 1, further comprising
an image pickup instruction section that instructs to pickup a still picture,
wherein the interrupt processing section executes the still picture pickup processing when the image pickup instruction section instructs to pickup a still picture, and
the sound output section outputs a notice tone along with the still picture pickup processing.

4. An image pickup device comprising:
an imaging section that executes a moving picture pickup processing and a still picture pickup processing;
a voice recording section that executes a voice recording processing in parallel with the moving picture pickup processing;
an interrupt processing section that sequentially executes, during the moving picture pickup processing by the imaging section, a processing to suspend the moving picture pickup processing by the imaging section, a processing to pickup a still picture by the imaging section, and a processing to resume the moving picture pickup processing by the imaging section,
wherein the interrupt processing section continually executes the voice recording processing executed by the voice recording section in parallel with the moving picture pickup processing before the moving picture pickup processing is suspended, until the moving picture pickup processing is resumed;
a suspension instruction section that instructs to suspend the moving picture pickup processing by the imaging section,
an image pickup instruction section that instructs to pickup a still picture, wherein the interrupt processing section executes a processing to suspend the moving picture pickup processing by the imaging section when the suspension instruction section instructs to suspend the moving picture pickup processing, and then, executes a still picture pickup processing by the imaging section when the image pickup instruction section instructs to pickup a still picture;
a shutter button capable of depressing in two stages, wherein
the suspension instruction section instructs to suspend the moving picture pickup processing by the imaging section in response to a half depression operation of the shutter button, and
the image pickup instruction section instructs to pickup a still picture in response to a full depression operation of the shutter button; and
wherein the interrupt processing section executes at least one of an auto focus processing and an auto iris processing, when the suspension instruction section instructs to suspend the moving picture pickup processing.

5. An image pickup device according to claim 4, wherein the interrupt processing section executes a through picture display processing, when the suspension instruction section instructs to suspend the moving picture pickup processing.

6. An image pickup device according to claim 4, further comprising:
a resumption instruction section that instructs to resume the moving picture pickup processing by the imaging section, wherein the interrupt processing section executes a processing to resume the moving picture pickup processing by the imaging section, when the resumption instruction section instructs to resume the moving picture pickup processing by the imaging section after the still picture pickup processing is completed; and wherein the resumption instruction section instructs to resume the moving picture pickup processing by the imaging section in response to releasing of a half depression operation of the shutter button.

7. A non-transitory computer readable medium containing a computer program product stored thereon, said computer program product controlling execution of a computer of an image pickup device with a function to pickup still pictures during a moving picture pickup operation, the computer program containing instructions for making the computer implement an imaging method, wherein the method comprises:

executing a moving picture pickup processing and a still picture pickup processing;

executing a voice recording processing in parallel with the moving picture pickup processing;

sequentially executing, during the moving picture pickup processing, an interrupt processing sequence including a processing to suspend the moving picture pickup processing, a processing to pickup a still picture, and a processing to resume the moving picture pickup processing, wherein the interrupt processing sequence continually executes the voice recording processing in parallel with the moving picture pickup processing before the moving picture pickup processing is suspended, until the moving picture pickup processing is resumed;

outputting a notice tone before the still picture pickup processing, and prohibiting a sound output section from outputting a notice tone when the image pickup device picks up a still picture in accordance with the interrupt processing and allows the sound output section to output a notice tone when the image pickup device picks up a still picture independently of the interrupt processing.

8. A non-transitory computer readable medium containing a computer program product stored thereon, said computer program product controlling execution of a computer of an image pickup device with a function to pickup still pictures during a moving picture pickup operation, the computer program containing instructions for making the computer implement an imaging method, wherein the method comprises:

executing a moving picture pickup processing and a still picture pickup processing;

executing a voice recording processing in parallel with the moving picture pickup processing;

sequentially executing, during the moving picture pickup processing, an interrupt processing sequence including a processing to suspend the moving picture pickup processing, a processing to pickup a still picture, and a processing to resume the moving picture pickup processing, wherein the interrupt processing sequence continually executes the voice recording processing in parallel with the moving picture pickup processing before the moving picture pickup processing is suspended, until the moving picture pickup processing is resumed;

issuing a suspension instruction to suspend the moving picture pickup processing, issuing an instruction to pickup a still picture, wherein the interrupt processing sequence executes a processing to suspend the moving picture pickup processing when the suspension instruction instructs to suspend the moving picture pickup processing, and then, executes a still picture pickup processing when the image pickup instruction instructs to pickup a still picture;

wherein the suspension instruction instructs to suspend the moving picture pickup processing in response to a half depression operation of a shutter button, and the image pickup instruction instructs to pickup a still picture in response to a full depression operation of the shutter button; and wherein the interrupt processing sequence executes at least one of an auto focus processing and an auto iris processing, when the suspension instruction instructs to suspend the moving picture pickup processing.

* * * * *